US012258897B2

(12) United States Patent
Okamoto

(10) Patent No.: US 12,258,897 B2
(45) Date of Patent: Mar. 25, 2025

(54) PURIFICATION SYSTEM

(71) Applicant: ISUZU MOTORS LIMITED, Yokohama (JP)

(72) Inventor: Takeshi Okamoto, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/596,717

(22) Filed: Mar. 6, 2024

(65) Prior Publication Data

US 2024/0309790 A1 Sep. 19, 2024

(30) Foreign Application Priority Data

Mar. 17, 2023 (JP) ................................ 2023-042769

(51) Int. Cl.

*F01N 3/30* (2006.01)
*F01N 3/08* (2006.01)
*F01N 3/22* (2006.01)
*F02M 26/00* (2016.01)
*F02M 27/06* (2006.01)
*F01N 3/10* (2006.01)

(52) U.S. Cl.

CPC ............... *F01N 3/303* (2013.01); *F01N 3/08* (2013.01); *F01N 3/0892* (2013.01); *F01N 3/225* (2013.01); *F02M 26/00* (2016.02); *F02M 27/06* (2013.01); *F01N 3/101* (2013.01); *F01N 2240/38* (2013.01); *F01N 2430/04* (2013.01); *F01N 2900/1404* (2013.01); *F01N 2900/1621* (2013.01)

(58) Field of Classification Search

CPC .......... F01N 3/101; F01N 3/225; F01N 3/303; F01N 2240/38; F01N 2430/04; F01N 2900/1404; F01N 2900/1621; F02M 27/06

USPC .................................. 60/287, 289, 299, 307

See application file for complete search history.

(56) References Cited

U.S. PATENT DOCUMENTS

2001/0003898 A1* 6/2001 Miller ..................... F01N 3/206 60/275
2010/0275586 A1* 11/2010 Hirata ................. F01N 13/0097 60/299
2014/0286827 A1* 9/2014 Kawada .................. C01B 13/10 422/108
2019/0383189 A1* 12/2019 Dou ........................ F01N 3/035

FOREIGN PATENT DOCUMENTS

JP 2005207316 A 8/2005
JP 2010-168981 A 8/2010
JP 2013-011193 A 1/2013

* cited by examiner

*Primary Examiner* — Jorge L Leon, Jr.
(74) *Attorney, Agent, or Firm* — Shih IP Law Group, PLLC.

(57) ABSTRACT

A purification system for purifying exhaust gas from an engine includes a separation part that separates oxygen and nitrogen contained in air, an ozone generation part that generates ozone from oxygen separated by the separation part, and a supply part that supplies ozone generated by the ozone generation part to an intake pipe and an exhaust pipe of the engine. The purification system includes a supply control device that adjusts an amount of ozone supplied to the intake pipe and an amount of ozone supplied to the exhaust pipe according to a purification rate of exhaust gas of the engine.

10 Claims, 3 Drawing Sheets

PURIFICATION SYSTEM

CROSS-REFERENCE TO RELATED APPLICATIONS

The present application claims priority to Japanese Patent Applications number 2023-42769, filed on Mar. 17, 2023, contents of which are incorporated herein by reference in their entirety.

BACKGROUND OF THE INVENTION

The present disclosure relates to a purification system for purifying exhaust gas of an engine. A technology for purifying exhaust gas of an engine is known. Japanese Unexamined Patent Application Publication No. 2005-207316 discloses a technology for purifying exhaust gas by supplying ozone generated from air to an exhaust pipe.

However, when ozone is generated from air, nitrogen oxides are generated from nitrogen contained in the air. Therefore, not only ozone but also nitrogen oxides could be supplied to the exhaust pipe.

BRIEF SUMMARY OF THE INVENTION

The present disclosure focuses on this point, and an object thereof is to suppress an increase in nitrogen oxides supplied to an exhaust pipe.

Means for Solving the Problems

An aspect of the present disclosure provides a purification system for purifying exhaust gas from an engine that includes a separation part that separates oxygen and nitrogen contained in air, an ozone generation part that generates ozone from oxygen separated by the separation part, and a supply part that supplies ozone generated by the ozone generation part to an intake pipe and an exhaust pipe of the engine.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Purification System S]

Figure 1:
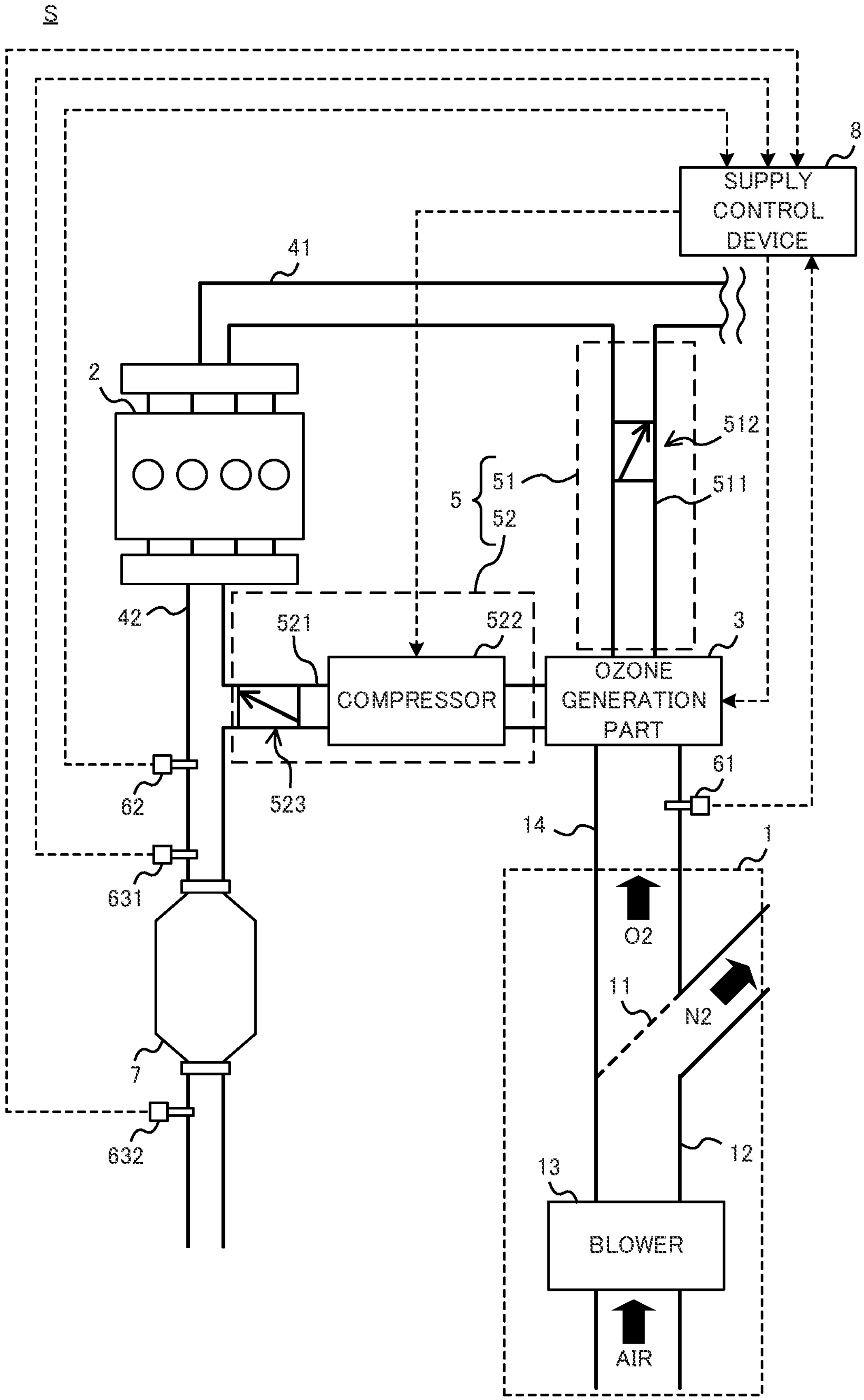
FIG. 1 illustrates a configuration of a purification system.

FIG. 1 illustrates a configuration of a purification system S. The purification system S includes a separation part 1, an engine 2, an ozone generation part 3, an intake pipe 41, an exhaust pipe 42, a supply part 5 having a first supply part 51 and a second supply part 52, an oxygen sensor 61, a temperature sensor 62, a first NOx sensor 631, a second NOx sensor 632, and a purification device 7. The purification system S is a system for purifying exhaust gas of the engine 2. The purification system S is provided in a vehicle, a ship, a power plant, or the like, for example.

The separation part 1 separates oxygen and nitrogen contained in air. For example, the separation part 1 includes a membrane 11, an air intake pipe 12, a blower 13, and an oxygen supply pipe 14. The membrane 11 is a gas separation membrane that allows oxygen to pass through but does not allow nitrogen to pass through. The membrane 11 is an oxygen permeable membrane that allows only oxygen to pass through or a nitrogen separation membrane that does not allow nitrogen to pass through, for example, but is not limited thereto. The air intake pipe 12 takes in air (atmosphere) from the outside. The blower 13 is provided in the air intake pipe 12. The blower 13 takes in air from the outside of the purification system S and feeds the air toward the membrane 11. The blower 13 is a centrifugal blower or an axial blower, for example, but is not limited thereto. The separation part 1 supplies the separated oxygen to the ozone generation part 3 and emits nitrogen to the outside (atmosphere).

The oxygen supply pipe 14 connects the separation part 1 and the ozone generation part 3. The oxygen sensor 61 is provided in the oxygen supply pipe 14. The oxygen sensor 61 detects an amount of oxygen flowing from the separation part 1 to the ozone generation part 3. The oxygen sensor 61 is a galvanic cell type oxygen concentration meter that measures concentration of oxygen contained in gas, for example. It should be noted that the oxygen sensor 61 is not limited to a galvanic cell type oxygen concentration meter, and may be a zirconia type, a magnetic type, or a laser spectral type oxygen concentration meter.

The ozone generation part 3 generates ozone from the oxygen separated by the separation part 1. The ozone generation part 3 converts oxygen into ozone by irradiating the oxygen with ultraviolet light, for example. Specifically, the ozone generation m includes an ultraviolet lamp, generates ultraviolet light by turning on the ultraviolet lamp, and converts the oxygen, which is separated by the separation part 1 and passes through the ozone generation part 3, into ozone. Further, the ozone generation part 3 includes discharge electrodes, generates ultraviolet light by discharging between the discharge electrodes, and converts the oxygen passing through the ozone generation part 3 into ozone. The discharge is corona discharge or spark discharge, for example, but is not limited thereto. The electric power used by the ozone generation part 3 to generate ozone is supplied from a battery, for example. Further, when the purification system S is installed in a vehicle, the electric power for the ozone generation part 3 may be supplied from a photovoltaic power generation system or a regenerative energy system installed in the vehicle.

The first supply part 51 supplies the ozone generated by the ozone generation part 3 to the intake pipe 41. The first supply part 51 includes a first pipe line 511 and a first check valve 512. The first pipe line 511 connects the ozone generation part 3 and the intake pipe 41. The first check valve 512 is provided between the ozone generation part 3 and the intake pipe 41. The first check valve 512 passes the gas traveling from the ozone generation part 3 to the intake pipe 41, and blocks the gas traveling from the intake pipe 41 to the ozone generation part 3. Specifically, the first check valve 512 passes the ozone from the ozone generation part 3 to the intake pipe 41, and blocks the ozone from the intake pipe 41 to the ozone generation part 3. The first check valve 512 is a disk check valve, for example, but is not limited thereto, and may be a poppet check valve, a swing check valve, or another type of check valve.

The engine 2 is an internal combustion engine that burns and expands a mixture of fuel and intake air (air) to generate power. The fuel is natural gas, gasoline, or light oil, for example. The engine 2 takes in the ozone supplied to the intake pipe 41 when taking in the intake air (air) from the intake pipe 41. Taking in the ozone into the cylinder promotes combustion activity, thereby improving the efficiency of fuel combustion. The engine 2 dispels exhaust through the exhaust pipe 42.

The second supply part 52 supplies the ozone generated by the ozone generation part 3 to the exhaust pipe 42. The second supply part 52 includes a second pipe line 521, a compressor 522, and a second check valve 523. The second pipe line 521 connects the ozone generation part 3 and the exhaust pipe 42. Specifically, the second pipe line 521 is connected between the engine 2 and the purification device 7 in the exhaust pipe 42.

The compressor 522 is provided between the ozone generation part 3 and the exhaust pipe 42. The compressor 522 is a centrifugal compressor, for example, but is not limited thereto. The compressor 522 compresses ozone and supplies the compressed ozone to the exhaust pipe 42. Specifically, the compressor 522 sucks in the ozone flowing from the ozone generation part 3 and pumps the ozone to the exhaust pipe 42. More specifically, the compressor 522 pumps the ozone to the exhaust pipe 42 at a pressure higher than the pressure of the exhaust gas flowing through the exhaust pipe 42. This allows the compressor 522 to supply ozone to the exhaust pipe 42 through which the exhaust gas flows at a higher pressure than atmosphere.

The second check valve 523 is provided between the ozone generation part 3 and the exhaust pipe 42. The second check valve 523 passes the gas traveling from the compressor 522 toward the exhaust pipe 42, and blocks the gas traveling from the exhaust pipe 42 toward the compressor 522. Specifically, the second check valve 523 passes the ozone from the compressor 522 toward the exhaust pipe 42, and blocks the ozone travelling from the exhaust pipe 42 toward the compressor 522. The second check valve 523 may be a check valve of the same type as the first check valve 512 or a check valve of a different type.

The exhaust pipe 42 is provided with the purification device 7. The purification device 7 purifies the exhaust gas from the engine 2. The purification device 7 is a selective catalytic reduction (SCR) catalyst, for example. The SCR catalyst promotes a reduction of nitrogen oxides to nitrogen and water when urea water, a precursor of ammonia, is injected into the exhaust gas flowing through the exhaust pipe 42 to cause the nitrogen oxides and the ammonia to react on the SCR catalyst. Specifically, urea water is injected into the exhaust gas when a temperature of the SCR catalyst is greater than or equal to a reaction temperature at which the SCR catalyst reacts, thereby using the heat of the exhaust gas to convert the urea water into ammonia and causing the ammonia and the nitrogen oxides to react on the SCR catalyst.

The purification device 7 may purify unburned hydrocarbons (for example, methane, ethane, propane, or the like) emitted from the engine 2 without having experienced combustion in a combustion process of the engine 2. In this case, the purification device 7 includes a methane reaction catalyst for causing methane to react. The purification device 7 purifies methane by converting the methane into hydrogen and carbon dioxide by causing the ozone and the methane, supplied upstream of the purification device 7, to react on the methane reaction catalyst. Specifically, the purification device 7 heats the methane reaction catalyst to the temperature at which the methane reaction catalyst is activated, and causes the ozone and the methane to react on the methane reaction catalyst.

The temperature sensor 62 is provided between the engine 2 and the purification device 7. The temperature sensor 62 detects an exhaust gas temperature. The temperature sensor 62 is a thermocouple or thermistor, for example, but is not limited thereto.

The first NOx sensor 631 is provided between the engine 2 and the purification device 7. The second NOx sensor 632 is provided downstream of the purification device 7. When the first NOx sensor 631 and the second NOx sensor 632 reach an activation temperature and enter an activation state, the first NOx sensor 631 and the second NOx sensor 632 output detection values corresponding to the amount of nitrogen oxides in the exhaust pipe 42. Specifically, the first NOx sensor 631 and the second NOx sensor 632 output the detection values proportional to the amount of oxygen generated when nitrogen monoxide, converted from nitrogen dioxide after oxygen is removed from the exhaust gas, is decomposed by a nitrogen monoxide reduction catalyst. In the following description, a ratio of the detection value of the second NOx sensor 632 to the detection value of the first NOx sensor 631 may be referred to as an exhaust gas purification rate of the purification device 7.

Figure 2:
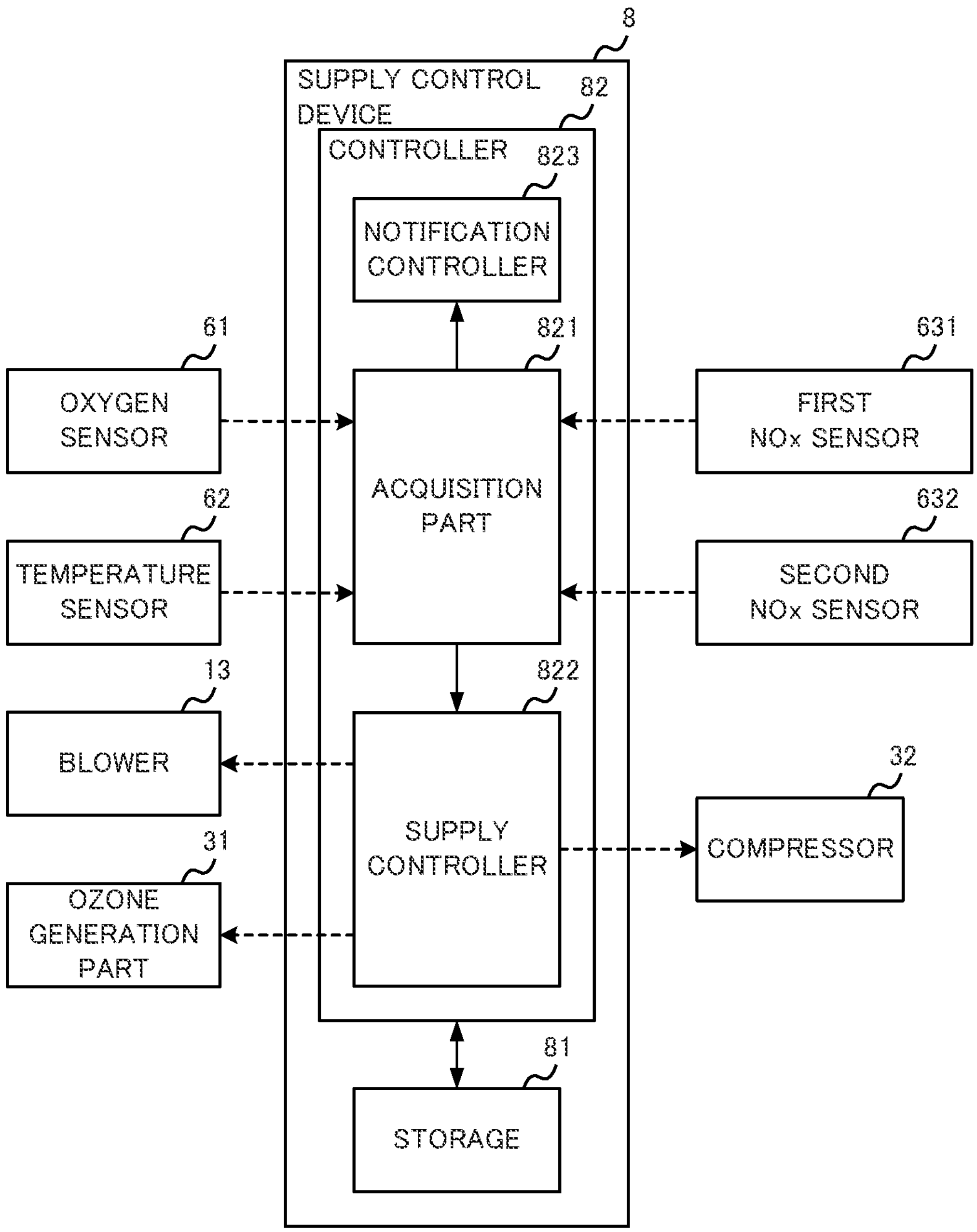
FIG. 2 illustrates a configuration of a supply control device.

A supply control device 8 causes the ozone generated by the ozone generation part 3 to be supplied to the intake pipe 41 and the exhaust pipe 42 of the engine 2. FIG. 2 illustrates a configuration of the supply control device 8. The supply control device 8 includes a storage 81 and a controller 82. The storage 81 is a storage medium including a Read Only Memory (ROM), a Random Access Memory (RAM), a hard disk, and the like. The storage 81 stores a program executed by the controller 82.

The controller 82 is a calculation resource including a processor such as a Central Processing Unit (CPU). The controller 82 functions as an acquisition part 821, a supply controller 822, and a notification controller 823 by executing the program stored in the storage 81.

The acquisition part 821 acquires a concentration of oxygen detected by the oxygen sensor 61. The acquisition part 821 acquires a temperature of the exhaust gas detected by the temperature sensor 62. The temperature of the exhaust gas is referred to as exhaust gas temperature below. Further, the acquisition part 821 acquires the detection value of the first NOx sensor 631 and the detection value of the second NOx sensor 632. The acquisition part 821 acquires the exhaust gas purification rate, which is a ratio of the second detection value of the second NOx sensor 632 to the first detection value of the first NOx sensor 631. Specifically, the acquisition part 821 acquires the exhaust gas purification rate by dividing the second detection value by the first detection value.

The controller 822 supplies the ozone generated by the ozone generation part 3 to each of the intake pipe 41 and the exhaust pipe 42. Specifically, the supply controller 822 operates the blower 13 provided upstream of the separation part 1 to supply air to the separation part 1. The oxygen contained in the supplied air passes through the membrane 11 of the separation part 1 and reaches the ozone generation part 3. On the other hand, nitrogen cannot pass through the membrane 11 and is emitted to the atmosphere. The supply controller 822 generates ozone by causing the ozone generation part 3 to irradiate oxygen with ultraviolet light to convert the oxygen passing through the ozone generation part 3 into ozone. The supply controller 822 then supplies the generated ozone from the supply part 5 to the intake pipe 41 and the exhaust pipe 42.

This allows the supply controller 822 to supply, to the intake pipe 41 and the exhaust pipe 42, ozone having a lower nitrogen oxide content compared to ozone generated from air, thus reducing the increase in nitrogen oxides to be sent to the exhaust pipe 42 that is upstream of the purification device 7. This makes it easier for the purification device 7 to purify nitrogen oxides and suppress an increase in nitrogen oxides emitted from the purification device 7 without being completely purified. As a result, the supply controller 822 can suppress a decrease in the exhaust gas purification rate of the purification device 7.

It should be noted that supplying ozone to the exhaust pipe 42 and the purification device 7 improves the purification rate of the purification device 7. Specifically, nitrogen monoxide (NO) among nitrogen oxides in the exhaust gas is oxidized by ozone ($O_3$) to be converted to nitrogen dioxide ($NO_2$), and the nitrogen dioxide ($NO_2$) is reduced by the purification device 7 to be nitrogen ($N_2$). In this manner, ozone promotes oxidation of nitrogen monoxide, so that a reduction reaction is likely to occur in the purification device 7. As a result, the purification rate of the purification device 7 is improved.

The supply controller 822 operates the compressor 522, when supplying ozone to the exhaust pipe 42, to pump ozone to supply the ozone to the exhaust pipe 42. Specifically, the supply controller 822 adjusts an output of the compressor 522 so that the pressure at which the compressor 522 emits ozone becomes higher than the pressure of the exhaust gas flowing through the exhaust pipe 42. This enables the supply controller 822 to supply ozone to the exhaust pipe 42 through which the exhaust gas having a higher pressure than the atmosphere flows.

The supply controller 822 adjusts the amount of ozone supplied to the intake pipe 41 and the amount of ozone supplied to the exhaust pipe 42 according to the purification rate of the exhaust gas from the engine 2. For example, the supply controller 822 increases the amount of ozone supplied to the intake pipe 41 and the amount of ozone supplied to the exhaust pipe 42 as the purification rate becomes lower. Specifically, the supply controller 822 first increases an output of the blower 13 to increase the air supplied to the separation part 1 as the purification rate becomes lower. Then, the supply controller 822 increases the amount of ozone to be generated by i) increasing the amount of light emitted from the ultraviolet lamp or ii) increasing the number of discharges by increasing the voltage applied between the electrodes by the ozone generation part 3. This allows the supply controller 822 to supply a greater amount of ozone to the intake pipe 41 and a greater amount of ozone to the exhaust pipe 42 as the purification rate becomes lower, which makes it easier for the purification device 7 to purify unburned hydrocarbons and nitrogen oxides. As a result, the supply controller 822 can improve the purification rate of the exhaust gas.

In order to improve the purification rate of the exhaust gas, it is desirable to reduce the amount of unburned hydrocarbons or nitrogen oxides supplied to the exhaust pipe 42 by suppressing the generation of unburned hydrocarbons or nitrogen oxide rather than purifying unburned hydrocarbons or nitrogen oxide that has been generated. In other words, supplying ozone to the intake pipe 41 rather than to the exhaust pipe 42 improves combustion efficiency, which results in reducing the generation of unburned hydrocarbons and nitrogen oxides, thereby improving the purification rate of the exhaust gas.

Therefore, the supply controller 822 increases the amount of ozone supplied to the intake pipe 41 to be greater than the amount of ozone supplied to the exhaust pipe 42 as the purification rate becomes lower. For example, the supply part 5 includes a flow rate adjustment valve capable of adjusting a first supply amount of ozone to the intake pipe 41 and a second supply amount of ozone to the exhaust pipe 42. Specifically, the first pipe line 511 is provided with a first flow adjustment valve. A second flow adjustment valve is provided between the ozone generation part 3 of the second pipe line 521 and the compressor 522.

The supply controller 822 controls the flow adjustment valves to increase the amount of ozone traveling from the ozone generation part 3 to the intake pipe 41 to be greater than the amount of ozone traveling from the ozone generation part 3 to the exhaust pipe 42. Specifically, the supply controller 822 adjusts opening degrees of the first flow adjustment valve and the second flow adjustment valve so that the first supply amount becomes larger than the second supply amount. More specifically, the supply controller 822 controls the opening degree of the first flow adjustment valve to be larger than the opening degree of the second flow adjustment valve. This allows the supply controller 822 to supply more ozone to the intake pipe 41 than to the exhaust pipe 42, which reduces unburned hydrocarbons and generation of nitrogen oxides, as a result of improved combustion efficiency of the engine 2, thereby improving the purification rate of the exhaust gas.

The supply controller 822 may lower the output of the compressor 522 as the purification rate becomes lower to reduce the amount of ozone flowing from the ozone generation part 3 to the exhaust pipe 42, thereby supplying more ozone to the intake pipe 41 than to the exhaust pipe 42. For example, the supply controller 822 lowers the output of the compressor 522 until the first supply amount becomes larger than the second supply amount. Specifically, the supply controller 822 sets the output of the compressor 522 to an output in which the first supply amount is larger than the second supply amount. Further, the supply controller 822 may stop the compressor 522 to set the output of the compressor 522 to 0. When the compressor 522 stops, the pressure of the ozone flowing from the ozone generation part 3 to the exhaust pipe 42 becomes lower than the pressure of the ozone flowing through the intake pipe 41. This prevents ozone from flowing from the ozone generation part 3 to the exhaust pipe 42, so that ozone is not supplied from the second supply part 52 to the exhaust pipe 42. As a result, the supply controller 822 can supply all the ozone generated by the ozone generation part 3 to the intake pipe 41, so that the amount of ozone supplied to the intake pipe 41 can be larger than the amount of ozone supplied to the exhaust pipe 42.

The supply controller 822 supplies ozone to the intake pipe 41 and the exhaust pipe 42 on the basis of the exhaust gas temperature. For example, the supply controller 822 supplies ozone to the intake pipe 41 and the exhaust pipe 42 when the exhaust gas temperature is lower than a predetermined value. The predetermined value is a reaction temperature at which unburned hydrocarbons or nitrogen oxide reacts on the catalyst of the purification device 7. The reaction temperature is about 200 to 300 degrees Celsius, for example, but is not limited thereto. Thus, the supply controller 822 supplies ozone to the intake pipe 41 and the exhaust pipe 42 when the exhaust gas temperature is lower than the reaction temperature of the catalyst, thereby increasing the combustion efficiency and reducing the amount of unburned hydrocarbons and nitrogen oxides. As a result, the supply controller 822 can improve the purification rate of the exhaust gas of the purification device.

When the exhaust gas temperature is equal to or higher than a predetermined value, the supply controller 822 does not supply ozone to the intake pipe 41 and the exhaust pipe 42. Specifically, the supply controller 822 stops the operation of the blower 13 and the ozone generation part 3. This enables the supply controller 822 to suppress electric power used for generating ozone, when the exhaust gas temperature is higher than the reaction temperature, thereby reducing power consumption of the purification system S.

When the amount of oxygen separated by the separation part 1 is equal to or less than an abnormality determination threshold value, the notification controller 823 notifies an abnormality of the separation part 1. Specifically, when the output value of the oxygen sensor 61 indicating the amount of oxygen separated by the separation part 1 is equal to or less than the abnormality determination threshold value, the notification controller 823 provides notification of an abnormality in the separation part 1. The abnormality in the separation part 1 is clogging of the membrane, for example. The notification controller 823 displays character information and image information indicating the abnormality in the separation part 1 on a display, or outputs a message indicating the abnormality in the separation part 1 to a speaker. Further, the notification controller 823 may provide information prompting replacement of the separation part 1. When the amount of oxygen separated by the separation part 1 is larger than the abnormality determination threshold value, the notification controller 823 determines that the separation part 1 is normal, and does not provide notification of the abnormality in the separation part 1. In addition, the notification controller 823 may provide notification that the separation part 1 is normal when the separation part 1 is normal.

[Process of Supplying Ozone]

Figure 3:
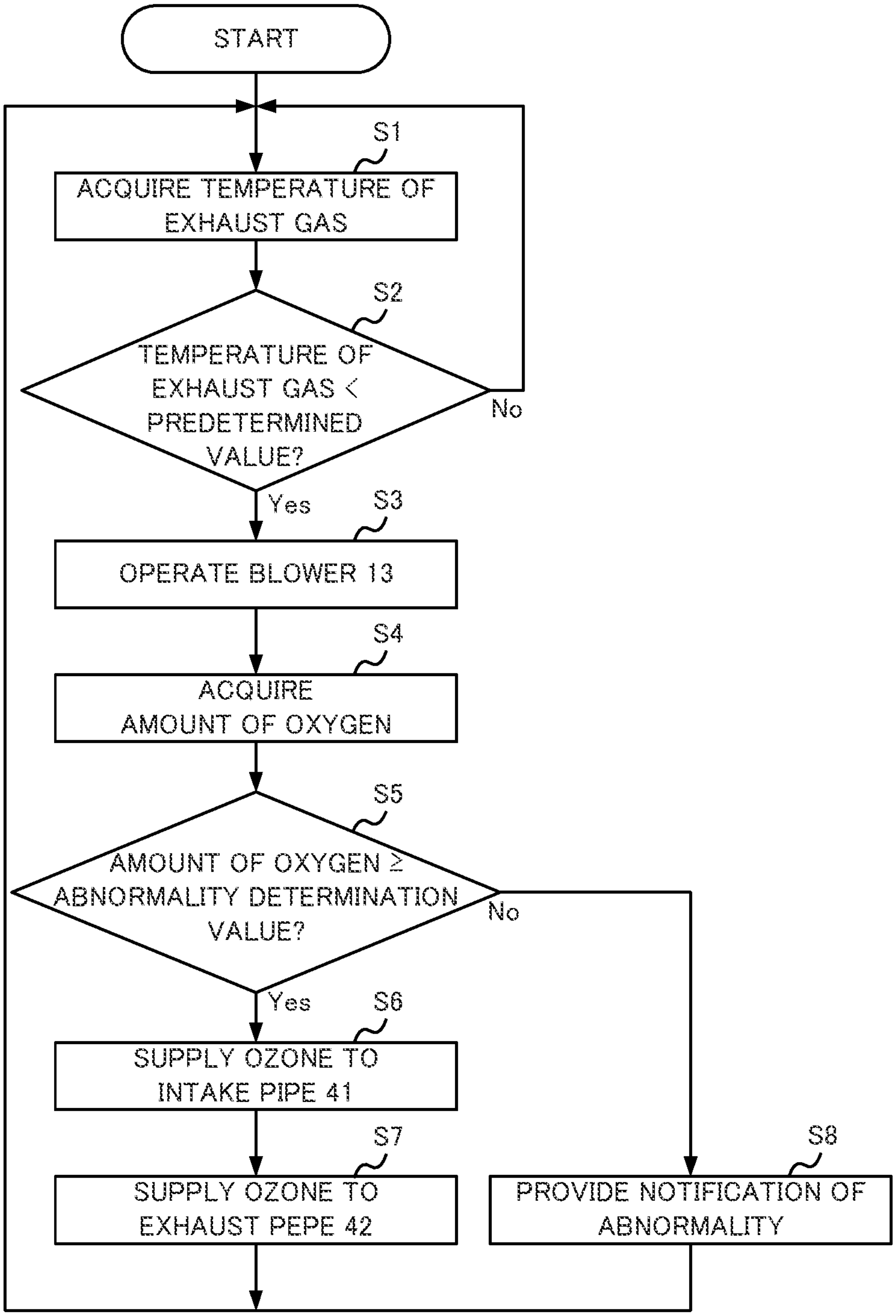
FIG. 3 is a flowchart showing an example of a process of supplying ozone to an intake pipe and an exhaust pipe, executed by the supply control device.

FIG. 3 is a flowchart showing an example of a process of supplying ozone to the intake pipe 41 and the exhaust pipe 42, executed by the supply control device 8. The flowchart in FIG. 3 is repeatedly executed while the engine 2 is operating.

The acquisition part 821 acquires the temperature of the exhaust gas flowing through the exhaust pipe 42 (step S1). Specifically, the acquisition part 821 acquires the exhaust gas temperature detected by the temperature sensor 62.

The acquisition part 821 determines whether or not the exhaust gas temperature is lower than the predetermined value (step S2). When the exhaust gas temperature is equal to or higher than the predetermined value (No in step S2), the acquisition part 821 waits until the exhaust gas temperature becomes lower than the predetermined value.

When the exhaust gas temperature is lower than the predetermined value (Yes in step S2), the supply controller 822 operates the blower 13 (step S3). Specifically, the supply controller 822 operates the blower 13 to supply air to the separation part 1.

The acquisition part 821 acquires the amount of oxygen separated by the separation part 1 (step S4). For example, the acquisition part 821 acquires, as the amount of oxygen, the oxygen concentration detected by the oxygen sensor 61 when the blower 13 is operating.

The supply controller 822 determines whether or not the amount of oxygen is equal to or greater than the abnormality determination threshold value (step S5). When the amount of oxygen is equal to or greater than the abnormality determination threshold value (Yes in step S5), the supply controller 822 supplies ozone from the first supply part 51 to the intake pipe 41 (step S6). Specifically, the supply controller 822 operates the ozone generation part 3 to supply the ozone generated by the ozone generation part 3 from the first supply part 51 to the intake pipe 41.

The supply controller 822 supplies ozone to the exhaust pipe 42 (step S7). Specifically, the supply controller 822 operates the compressor 522 to pump the ozone generated by the ozone generation part 3 to the exhaust pipe 42.

When amount of oxygen is less than the abnormality determination threshold value (No in step S5), the notification controller 823 provides notification of the abnormality in the separation part 1 (step S8). Specifically, the notification controller 823 causes a display to display character information and image information indicating the abnormality in the separation part 1, or causes the speaker to output a message indicating the abnormality in the separation part 1.

[Effect of Purification System S]

As described above, the purification system S separates oxygen and nitrogen contained in air, and generates ozone from the separated oxygen. This allows the purification system S to generate ozone from the oxygen gas having a lower nitrogen content than air, and so it is possible to suppress the generation of nitrogen oxides when generating ozone compared to when generating ozone from air. Then, the purification system S supplies ozone, having a smaller amount of nitrogen oxide than ozone generated from air, to the intake pipe 41 and the exhaust pipe 42 of the engine 2. As a result, the purification system S suppresses an increase in nitrogen oxides contained in the exhaust gas from the engine 2, and suppresses the supply of nitrogen oxides to the exhaust pipe 42. In this way, the purification system S can suppress a decrease in the exhaust gas purification rate of the purification device 7 caused by an increase in the nitrogen oxide.

Further, the intake air containing ozone promotes combustion of a fuel and intake-air mixture, and therefore the purification system S can reduce the amount of unburned hydrocarbons by supplying the ozone to the intake pipe 41, thereby improving the purification rate of the exhaust gas. Furthermore, the amount of unburned hydrocarbons in the exhaust gas is reduced due to the reaction between the ozone, supplied to the exhaust gas, and the unburned hydrocarbons on the catalyst. In addition, the ozone converts nitrogen oxides to nitrogen dioxide, which promotes reduction of nitrogen oxides in the exhaust gas by the purification device 7, thereby reducing the amount of nitrogen oxides in the exhaust gas. In this manner, the purification system S can reduce the amount of unburned hydrocarbons and nitrogen oxides, thereby improving the purification rate of the exhaust gas.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A purification system for purifying exhaust gas from an engine, the purification system comprising:

a separation part that separates oxygen and nitrogen contained in air received from a secondary air intake pipe;

an ozone generation part that generates ozone from the separated oxygen;

a supply part that supplies a first amount of the generated ozone to a main intake pipe of the engine, and supplies a second amount of the generated ozone to an exhaust pipe of the engine; and a supply controller that increases the first amount so as to be greater than the second amount.

2. The purification system according to claim 1, wherein:

the supply controller adjusts the first amount and the second amount based on a purification rate of the exhaust gas.

3. The purification system according to claim 1, wherein;

the supply part includes a flow rate adjustment valve that adjusts the first amount and the second amount, and the supply controller adjusts an opening degree of the flow rate adjustment valve such that the first amount becomes greater than the second amount.

4. The purification system according to claim 1, wherein:

the separation part includes a membrane which enables oxygen to pass through while preventing nitrogen from passing through.

5. The purification system according to claim 1, wherein:

the supply controller activates the supply part when a temperature of the exhaust gas is less than a predetermined value, and deactivates the supply part when the temperature of the exhaust gas is greater than or equal to the predetermined value.

6. The purification system according to claim 1, further comprising:

a compressor provided between the ozone generation part and the exhaust pipe so as to pump the second amount of the generated ozone to the exhaust pipe.

7. The purification system according to claim 6, wherein:

the supply controller decreases an output of the compressor until the first amount becomes greater than the second amount.

8. The purification system according to claim 1, further comprising:

a purification device that purifies the exhaust gas by reacting the generated ozone with unburned hydrocarbons emitted from the engine, wherein the supply part supplies the second amount of the generated ozone to a region of the exhaust pipe upstream of the purification device.

9. The purification system according to claim 1, wherein:

the ozone generation part generates the ozone by irradiating the separated oxygen with ultraviolet light.

10. The purification system according to claim 9, wherein:

the ultraviolet light is produced by activating an ultraviolet lamp or by an electrical discharge between electrodes.

* * * * *